May 19, 1959 H. C. FOX ET AL 2,887,135
ADZING APPARATUS FOR RAILROAD CROSSTIES
Filed April 30, 1958 10 Sheets-Sheet 1

FIG-1

INVENTORS.
Herbert C. Fox
Richard E. Franklin
BY
Jennings, Carter & Thompson
Attorneys May 19, 1959

H. C. FOX ET AL 2,887,135

ADZING APPARATUS FOR RAILROAD CROSSTIES

Filed April 30, 1958

INVENTORS.
Herbert C. Fox
Richard E. Franklin
BY

Jennings, Carter & Thompson

Attorneys

May 19, 1959 H. C. FOX ET AL 2,887,135
ADZING APPARATUS FOR RAILROAD CROSSTIES
Filed April 30, 1958 10 Sheets-Sheet 8

INVENTORS.
Herbert C. Fox
Richard E. Franklin
BY
Jennings, Carter & Thompson
Attorneys May 19, 1959   H. C. FOX ET AL   2,887,135
ADZING APPARATUS FOR RAILROAD CROSSTIES
Filed April 30, 1958   10 Sheets-Sheet 9

INVENTORS.
Herbert C. Fox
Richard E. Franklin
BY
Jennings, Carter + Thompson
Attorneys United States Patent Office 2,887,135
Patented May 19, 1959

2,887,135

ADZING APPARATUS FOR RAILROAD CROSSTIES

Herbert C. Fox, Atlanta, Ga., and Richard E. Franklin, Chevy Chase, Md., assignors to Kershaw Manufacturing Company, Inc., a corporation of Alabama Application April 30, 1958, Serial No. 732,004

19 Claims. (Cl. 144—133)

This invention relates to adzing apparatus for railroad crossties and more particularly to such apparatus for adzing crossties at the seats of a rail which has been removed.

It is the object of the present invention to provide a vehicle having a frame on which two or more adzing tools are mounted in spaced relation longitudinally of the track for rotation in a horizontal plane for adzing the crossties at the seats of a removed rail. The adzing tools are arranged with a plurality of circular cutter blades radially spaced about the circumference thereof.

It is a further object of the present invention to provide adzing apparatus having a pair of slidable support frames mounted on a railway vehicle and movable inwardly and outwardly of the vehicle. A retractable support wheel for riding on a rail in the non-working position of the apparatus, and a crawler member for riding on the crossties in the working position of the apparatus are mounted in side-by-side relation on the slidable frames. Thus, the slidable support frames may be moved outwardly from the vehicle when in working position with one rail removed whereby the crawler member engages the crossties, and may be moved inwardly of the vehicle in non-working position whereby the retractable wheel engages and rides on a rail. By arranging the crawlers in side-by-side relation with the retractable wheels, sufficient space between the crawlers is provided for arranging in tandem three adzing tools between the crawlers. A very compact apparatus is obtained as a result of this arrangement.

An additional object of the present invention is to provide adzing apparatus that may be operated in either direction on one side of the railroad track, or may be pivoted about a central support for an adzing operation on the opposite side of the railroad track. The central support is arranged substantially at the center of gravity of the adzing apparatus and also supports the apparatus when it is lowered to working position from non-working position, and raised from non-working position to working position.

Briefly described, our invention comprises a vehicle having retractable support wheels on both sides thereof for riding on the rails and supporting the adzing apparatus in non-working or travelling position thereof. A pair of double flanged wheels and a pair of endless chain crawlers are provided for supporting the adzing apparatus in the working position of the adzing apparatus in which one rail of the track is removed. Slidable frames are arranged on the working side of the vehicle and each slidable frame has mounted thereon a retractable wheel and a crawler in side-by-side relation. The crawlers ride on the crossties in the seats of the removed rail and thereby aid in guiding the adzing apparatus while the double flanged wheels ride on the remaining rail and aid in keeping the adzing apparatus from sliding off the rail. Adzing tools are mounted between the slidable frames and engage the crossties in cutting relation at the tie plate seats of the removed rail. Brush means are mounted on the forward and rear ends of the vehicle frame for cleaning the top surface of the crossties of ballast and foreign matter. The brush means on the front end of the apparatus thereby clears a path for the adzing tools. Preservative treating means is carried by the vehicle rearwardly of the adzing tools and is adapted for treating the crossties only on the newly adzed areas. Thus, it is evident that a single adzing machine is provided that cleans the surface of the crossties of ballast and treats the adzed areas of the crossties with a preservative.

Apparatus embodying features of our invention is shown in the accompanying drawings forming a part of this application in which.

Figure 1:
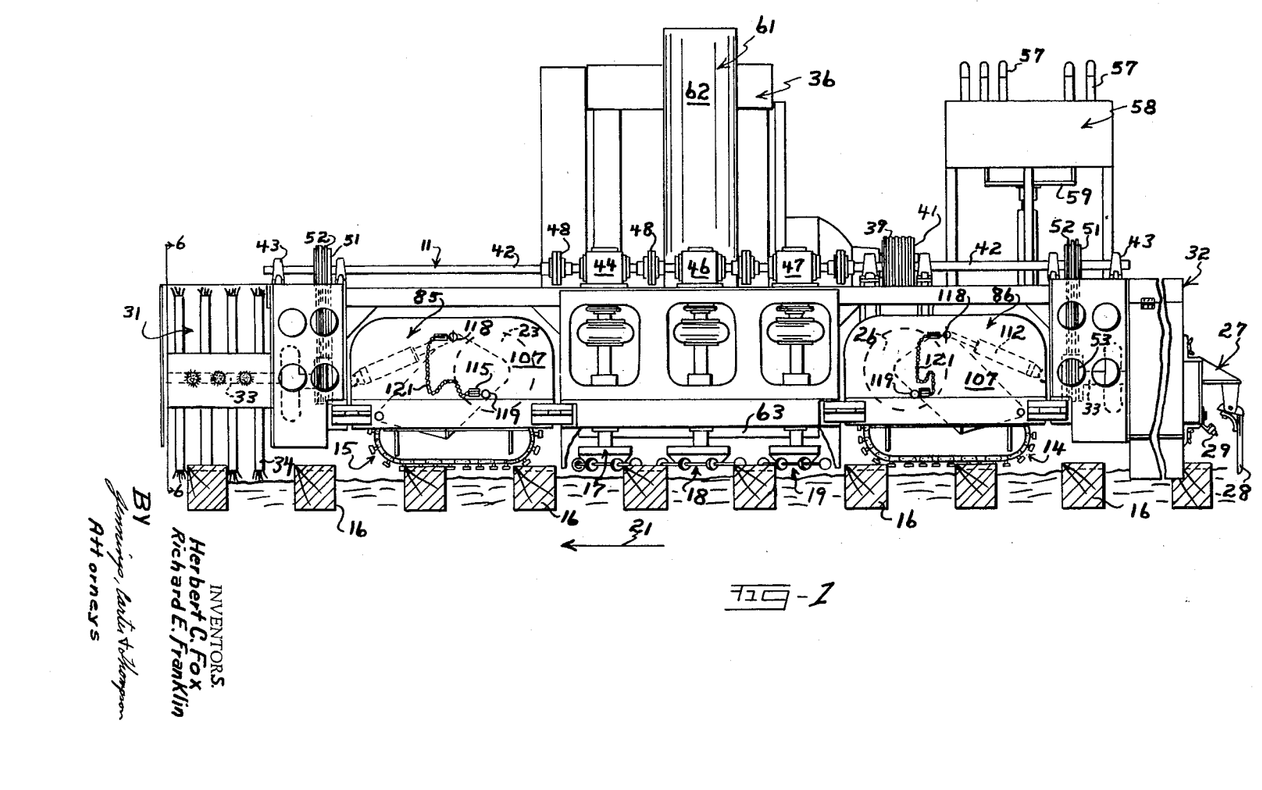
Fig. 1 is a side elevational view of the adzing apparatus forming the present invention taken from the working side of the apparatus and showing the apparatus in working position on the crossties with one of the rails removed.
Figure 2:
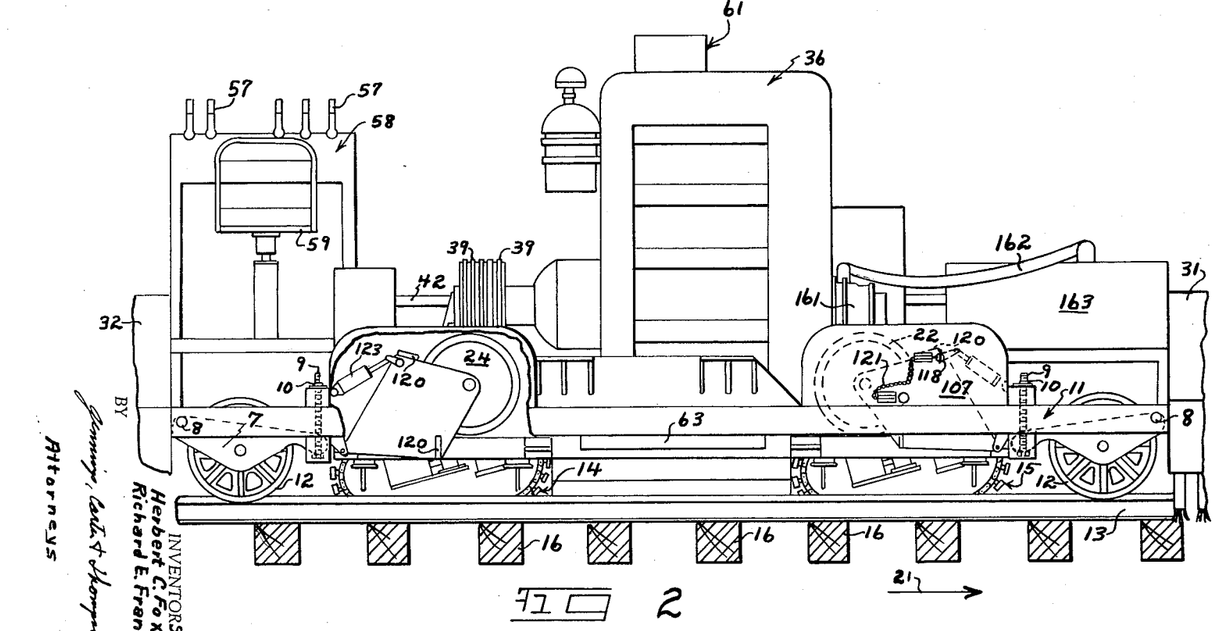
Fig. 2 is a side elevational view of the apparatus embodying the present invention and taken from the side of the apparatus opposite that of Fig. 1 and showing the apparatus in working position.

Referring now to the drawings for a better understanding of our invention, we show in Figs. 1 and 2 the adzing apparatus in working position. Fig. 1 is viewed from the working side of the apparatus, namely the side thereof on which the adzing tools are positioned, and Fig. 2 is viewed from the opposite non-working side.

The adzing apparatus comprises a vehicle indicated generally by the numeral 11, having fixed thereto on the non-working side a pair of double flanged wheels 12 (see Fig. 5 also) adapted for riding on the rail 13 in the working position of the adzing apparatus. The flanged wheels 12 are mounted in housings 7 pivotally connected at 8 to vehicle 11 and vertically adjustable by screw 9 and nut 10. The wheels 12 are removed from rail 13 in the non-working position of the apparatus (see Fig. 4). Rear and front endless, chain-type crawler supports indicated generally by the numerals 14 and 15, respectively, support the adzing apparatus in working relation on the working side thereof and are adapted for riding in the grooves formed in the crossties 16 by tie plates supporting a removed rail. The crawlers 14 and 15 aid in guiding the adzing apparatus and engage at least two crossties simultaneously thereby providing a level support for the apparatus. It is understood that the level support maintains the adzing apparatus in a generally parallel relation to the rails and the crossties. In the working position of the adzing apparatus, the rail on the working side of the apparatus is removed while the other rail remains in place on the crossties 16. Arranged between the crawlers 14 and 15 on the working side of the adzing apparatus are front, center, and rear adzing tools indicated generally by the numerals 17, 18 and 19, respectively, which are adapted for engaging the crossties 16 in cutting relation at the seat formed by the tie plates. The direction of movement of the adzing apparatus shown in Figs. 1 and 2 is indicated by the arrow 21. Center adzing tool 18 is of a larger diameter than either of the adzing tools 17 or 19 and thereby takes a wider cut on the crossties than adzing tools 17 and 19. Adzing tool 18 is preferably arranged to take a deeper cut than adzing tools 17 and 19 which are arranged at the same depth. The cutting is thereby distributed between the center and the front adzing tool since the rear adzing tool 19 is of the same height and cutting diameter as the front adzing tool 17. Thus, if the direction of the adzing apparatus is reversed from the direction shown in Fig. 1, adzing tool 19 will be in cutting engagement with the crossties 16 without any adjustment necessary. The center adzing tool 18 engages the crossties 16 in working position in both directions of travel.

If desired, all of the adzing tools 17, 18 and 19 may be of the same diameter and may be arranged in staggered relation to the upper surface of the crossties with adzing tool 17 taking the smallest cut and adzing tool 19 taking the deepest cut.

Figures 4, 6:
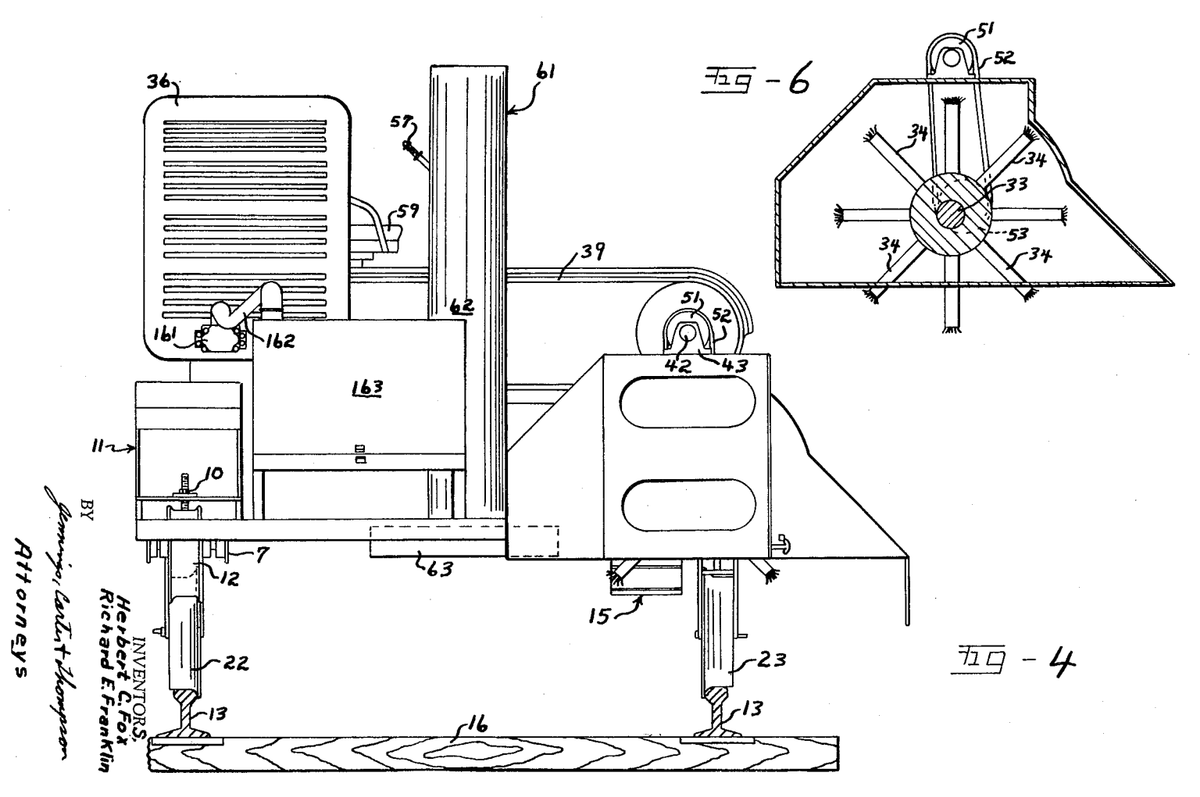
Fig. 4 is a front end elevational view showing the apparatus of the present invention in non-working position with retractable wheels thereon riding on the rails.
Fig. 6 is a fragmentary elevational view of the brush means arranged on the front end of the apparatus looking generally along the line 6—6 of Fig. 1.

To support the adzing apparatus in non-working position as shown in Fig. 4, retractable front wheels 22 and 23 are positioned at the front portion of the vehicle 11 and retractable rear wheels 24 and 26 are arranged on the rear portion of vehicle 11. To move the adzing apparatus from the non-working position shown in Fig. 4 to the working position shown in Figs. 1, 2 and 5, all four retractable wheels 22, 23, 24 and 26 are raised simultaneously and the vehicle 11 with the crawler wheels 14 and 15 and the double flanged wheels 12 is lowered to working position as will be explained in detail below.

To preserve the newly adzed areas on the crossties, preservative treating means indicated generally by the numeral 27 is provided on the rear of the adzing apparatus as shown in Fig. 1. The preservative treating means 27 comprises an arm 28 adapted for engaging the side of a crosstie 16 and thereby actuating a nozzle 29 through which the preservative is sprayed on the newly adzed areas as the treating means passes thereover. Thus, only the newly adzed areas are treated and no preservative is wasted on the space between adjacent crossties 16.

To clean the top surface of crossties 16 at the seats of the removed rail and to clear the ballast from the top of the crossties and from the path of the adzing tools, brush means 31 and 32 are located on the front and rear ends, respectively, of the adzing apparatus. As shown in Fig. 6, the brush means comprise a rotary shaft 33 on which is mounted a plurality of flexible steel cables 34 which sweep the ballast from the top of the crossties and levels the ballast in the path of the adzing tools. The rear brush means 32 further cleans the crossties in the event ballast remains on the crossties after the adzing tools pass thereover. If desired, suitable clutch means may be provided for disengaging the rear brush means although such means are not shown in the drawings. The primary function of the rear brush means 32 is in the event the travel of vehicle 11 is reversed in which case it clears a path for the adzing tools.

Figure 3:
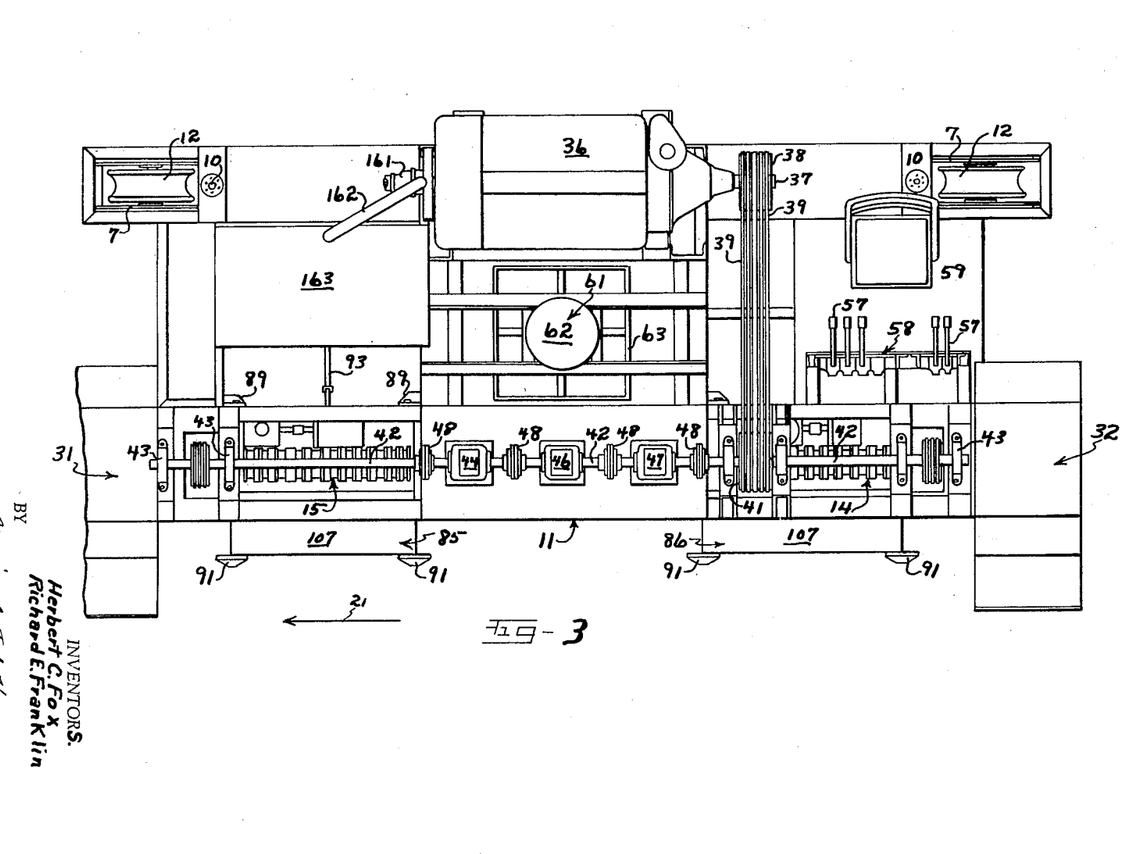
Fig. 3 is a top plan view of the apparatus shown in Figs. 1 and 2.

For driving the adzing apparatus, a gasoline engine 36 is positioned on the main frame for vehicle 11 and has a drive shaft 37 extending from one end thereof. As shown in Fig. 3, pulleys 38 are mounted on drive shaft 37 and have V-belts 39 thereover running to pulleys 41 on the opposite side of the adzing apparatus. A countershaft 42 is secured to pulley 41 and is mounted in pillow blocks 43. Gear boxes 44, 46 and 47 are arranged along countershaft 42 for the adzing tools 17, 18 and 19 respectively. Couplings 48 are arranged on each side of the gear boxes for transmitting drive thereto.

Brush means 31 and 32 are both driven in the same manner and for purposes of illustration only the drive for brush means 31 is shown. As shown in Fig. 6, pulley 51 is secured to shaft 42 at one end thereof and V-belts 52 extend thereover to pulley 53 which drives brush shaft 33 through suitable connections.

For controlling the operation of the adzing apparatus, levers 57 on a control panel 58 are located conveniently for an operator of the adzing apparatus on the seat 59 (see Fig. 3).

Figures 5, 7, 8:
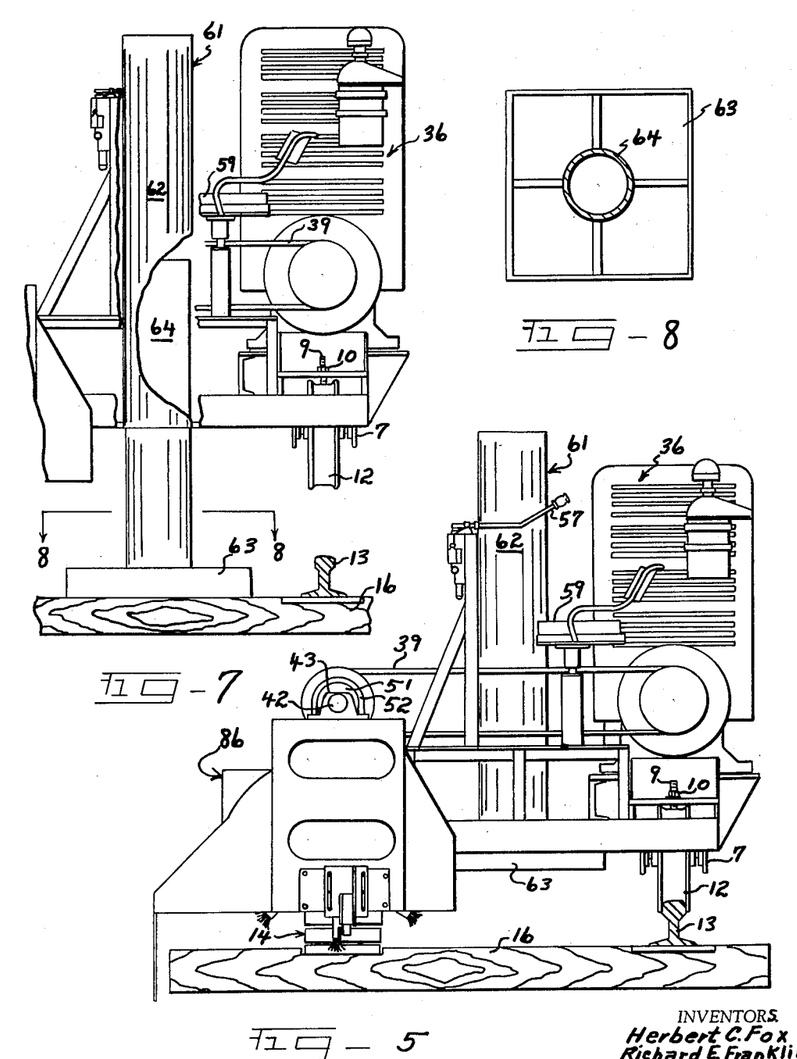
Fig. 5 is a rear end elevational view of the invention showing the apparatus in working position with crawlers on the working side of the apparatus riding in the crosstie seats of the removed tie plates and double flanged wheels on the other side of the apparatus riding on the rails.
Fig. 7 is a fragmentary elevational view, partly broken away and in section, showing the central support for the adzing apparatus with the adzing apparatus being removed from the rails and supported wholly by the central support.
Fig. 8 is a cross sectional view of the lower portion of the central support taken generally along the line 8—8 of Fig. 7.

In order to allow the adzing apparatus to be pivoted 360° and to support the adzing apparatus while it is being lowered to working position or raised from working position, hydraulic jack lifting means indicated generally by the numeral 61, and comprising a single central support is provided and is positioned at substantially the center of gravity of the entire adzing apparatus. As shown in Figs. 7 and 8, the central support comprises a hydraulic cylinder 62 having a platform 63 attached to the lower end of piston 64. Platform 63 is adapted for resting on the top surface of the crossties 16. Upon actuation of the hydraulic cylinder 62 to raise the adzing apparatus, the piston 64 and platform 63 are lowered until platform 63 rests on the crossties 16. Further actuation of cylinder 62 raises the adzing apparatus from the track where it is supported only by the platform 63. In this position the adzing apparatus can be pivoted 180° about platform 63 by the force exerted by only one workman, thereby placing the working tools on the opposite side of the track from which they were originally positioned and allowing an adzing operation thereat.

Figures 9, 10, 11:
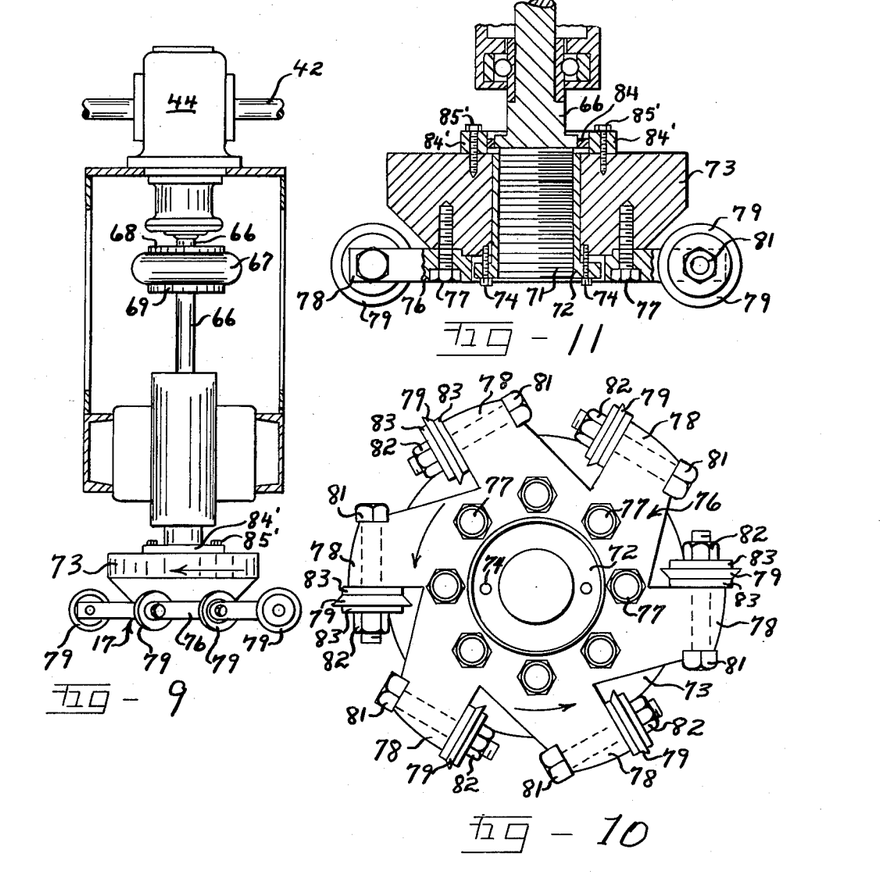
Fig. 9 is a fragmentary elevational view, partly broken away and in section, of an adzing tool of the present invention.
Fig. 10 is a bottom plan view of the adzing tool shown in Fig. 9 and showing a plurality of circular cutting blades on the cutter of the adzing tool.
Fig. 11 is a longitudinal sectional view of the cutter of the adzing tool and showing oppositely arranged cutting blades in elevation.

In Figs. 9, 10 and 11, the adzing tool indicated generally by the numeral 17 is shown for purposes of illustration, the adzing tools 18 and 19 being similar in all respects except that the cutter of adzing tool 18 is formed preferably of a larger diameter in order to take a wider cut on the crossties. The adzing tool 17 comprises a cutter shaft 66 extending downwardly from gear box 44 to a rubber coupling 67 adapted for taking up shock from the cutter and allowing slippage between the upper and lower portions of shaft 66. The upper portion of shaft 66 is attached to coupling 67 by a plate 68 secured thereto and the lower portion of shaft 66 is secured to coupling 67 by plate 69.

A rotary cutter is mounted on the lower threaded end 71 of shaft 66. A threaded sleeve 72 is screwed onto the lower threaded end 71 and has secured thereto a cutter body portion 73 by suitable means 74. A cutter head 76 is secured to the lower end of body portion 73 through bolts 77. Cutter head 76 is provided with radial projections 78 on which are mounted circular cutter blades 79. Cutter blades 79 are secured to the projections 78 by bolts 81 and nuts 82. Washers 83 are provided on each side of the cutter blades 79 for securing the blades against rotation. The blades 79 are beveled on their outer edges thereby having a cutting surface on the entire circumference thereof. This allows blades 79 to be rotated thereby to present a new cutting surface if a portion of the cutting surface becomes dull or worn. A square flange 84 is welded to shaft 66 and a plate 84' having a square opening therethrough is placed around flange 84. Plate 84' is secured to the upper end of body portion 73 by suitable bolts 85' and may be slipped vertically relative to flange 84.

To adjust the cutter head 76 in height relative to the top surface of the crossties 16, so that cutter head 76 may be removed from cutting relation with the crossties 16 or may be adjusted to take a different depth of cut, all that is necessary is that the bolts 85' be removed from contact with body portion 73. Then the cutter head 76 can be rotated thereby screwing or unscrewing sleeve 72 from the threaded end 71. When the cutter head 76 is adjusted to the proper height, plate 84' is moved relative to flange 84 until it is again in contact with body portion 73 in which position the bolts 85' are secured.

Front and rear sliding frames 85 and 86, respectively, are provided on the working side of the adzing apparatus (see Fig. 1) and each sliding frame has mounted thereon a retractable wheel and a crawler. Front sliding frame 85 has mounted thereon crawler 15 and retractable wheel 23 while rear sliding frame 86 has mounted thereon crawler 14 and retractable wheel 26. While we have shown the sliding frames for use with adzing tools for the purposes of illustration, it is understood that our sliding frames may be used on any railroad vehicle in which it is desired to mount a retractable wheel and a crawler in side by side relation. The front and rear sliding frames are similar in operation and construction and for the purposes of illustration only sliding frame 86 is described.

Figures 14, 15:
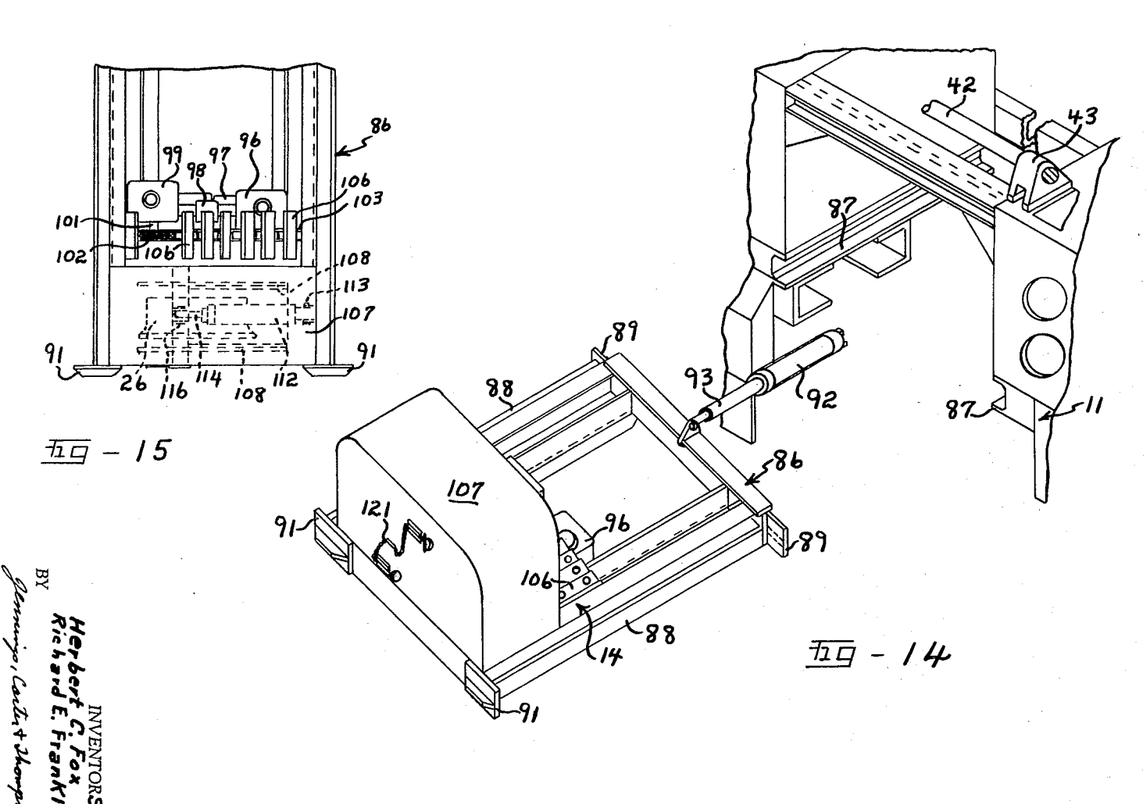
Fig. 14 is a perspective view of the sliding frame in Figs. 12 and 13 shown removed from the adzing apparatus.
Fig. 15 is a top plan view of the sliding frame shown in Fig. 14.

Referring now to Figs. 12, 13, 14 and 15, rear sliding frame 86 is shown positioned on the rear of the vehicle 11 and is adapted for sliding inwardly and outwardly from the vehicle 11 in a horizontal plane. As shown in Fig. 14, the sliding frame 86 is removed from the main frame of the vehicle 11. Channels 87 are provided on the main frame for supporting the sliding frame. Slide rails 88 on each side of the sliding frame 86 fit in channels 87 and frame 86 moves inwardly and outwardly thereon. To limit outward movement of frame 86, rear stops 89 are positioned at the rear ends of slide rails 88 and abut the ends of channels 87 when the frame 86 is moved outwardly thereby limiting the outward movement of frame 86. Front stops 91 are provided on the front end of the slide rails 88 and abut the outer faces of channels 87 when sliding frame 86 is moved inwardly thereby limiting the inward movement of frame 86. A hydraulic cylinder 92 is pivotally secured at one end to the underside of the vehicle frame. A piston rod 93 extends from the other end of hydraulic cylinder 92 and is pivotally secured to the rear edge of the frame 86 for sliding the frame inwardly and outwardly from the working side of the adzing apparatus. The non-working side of the adzing apparatus is not provided with sliding frames but does have retractable wheels 22 and 24 which are similar to the retractable wheels 23 and 26, respectively.

Crawlers 14 and 15 are similar in construction and for the purposes of illustration only crawler 14 is described. A reversible fluid motor 96 (see Fig. 15) is mounted on the frame 86 and has a drive shaft 97 extending therefrom to a coupling 98. Coupling 98 transmits the drive to the gear reduction box 99. Gear reduction box 99 has an output shaft 101 extending therefrom to sprocket 102 which engages sprocket chain 103 of the crawler. Sprocket chain 103 extends around a downwardly extending guide plate 104 fixed to the underside of the frame 86. Supporting feet or treads 106 are mounted on sprocket chain 103 and are adapted for resting on the crossties 16 at the seat of the removed rail and supporting the adzing apparatus thereon. Fluid motor 96 is reversible so that crawler 14 can be driven in either a forward or a reverse direction.

The crawlers 14 and 15 are thus fixed to the sliding frames and there is no relative vertical movement between the crawlers and vehicle 11. The adzing tools 17, 18 and 19 are mounted so that they are in alignment with the crawlers 14 and 15 when in working position and thus the adzing tools remain at a predetermined height in relation to the crawler. If the apparatus is not level with the surface of the crossties 16 when in working position, the double flange wheels 12 can be adjusted by the nuts 10. Therefore, the adzing tools can be easily maintained with the cutters in parallel relation to the crossties and thereby cut a uniform tie plate seat which has been difficult heretofore.

Figure 12:
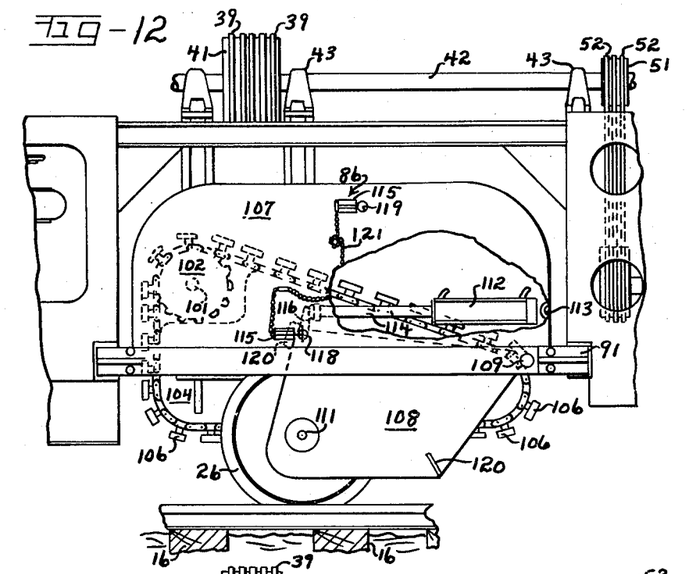
Fig. 12 is a fragmentary, side elevational view of a sliding frame on the working side of the apparatus and showing a retractable wheel thereon riding on the rail in non-working or travelling position of the apparatus.
Figure 13:
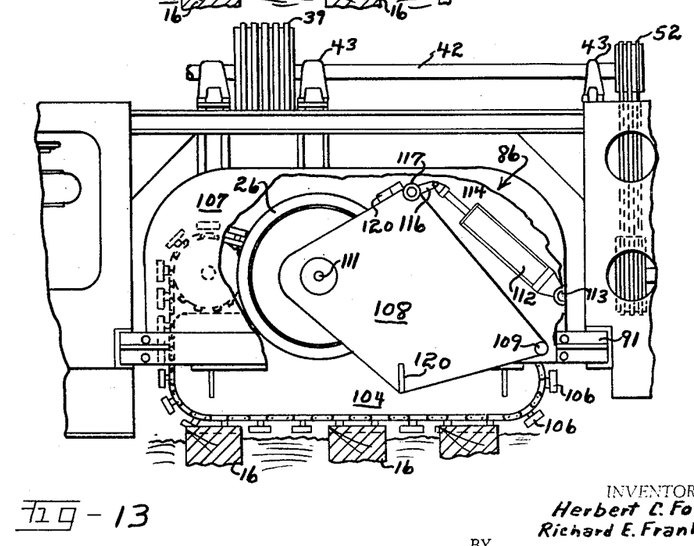
Fig. 13 is a fragmentary, side elevational view of the sliding frame shown in Fig. 12 in working position with the retractable wheel retracted and the crawler riding on the crossties.

Mounted on the rear sliding frame 86 in side-by-side relation to the crawler 14 is retractable wheel 26 adapted for riding on the rail 13 in the non-working position of the adzing apparatus as shown in Fig. 12. The retractable wheel 26 is shown raised in Fig. 13 in the working position of the adzing apparatus. A housing 107 is fixed on frame 86 and has pivotally mounted therein a movable inner housing 108 pivotally mounted at 109 to the outer fixed housing 107 and comprising two parallel side plates. Wheel 26 is mounted on an axle 111 extending between the side plates. For raising and lowering wheel 26, a hydraulic cylinder 112 is pivotally mounted to the housing 107 at 113 and a piston rod 114 extends therefrom. Piston rod 114 is pivotally connected to a bracket 116 secured to the top of a sleeve 117 extending between the side plates of the inner housing 108 and adapted for receiving a pin 118 therethrough. Openings 119 are provided in housing 107 and are aligned with the sleeve 117 in the retracted and projected positions of the retractable wheel 26. Pin 118 is secured to the housing 107 by a chain 121 and is held in the sleeves 117 by latches 115. Thus, the retractable wheel 26 may be secured in its raised position by inserting pin 118 through the upper opening 119 and aligned sleeve 117. Likewise, to secure the retractable wheel 26 in lowered non-working position, pin 118 is inserted through the lower opening 119 and the aligned sleeve 117. Stops 120 are provided on the inner housing 108 to stop the upward and downward movement of the housing 108 by engaging the vehicle frame and thereby position accurately the openings 119 with sleeve 117.

The retractable rear wheels 24 and 26 are similar in construction and function except that rear wheel 26 on the working side of the apparatus is mounted on a sliding frame whereas the rear retractable wheel 24 on the non-working side of the apparatus is pivoted directly to the vehicle frame. The rear retractable wheels 24 and 26 are not driven but are provided with brakes within the retractable housing. Also, the rear retractable wheels 24 and 26 are mounted in inner spring mounted housings that move outwardly as the rear wheels ride over uneven rail joints or depressions in the track thereby keeping the vehicle 11 firmly on the track. For the purpose of illustration, only the retractable rear wheel 24 is shown in detail.

Figure 16:
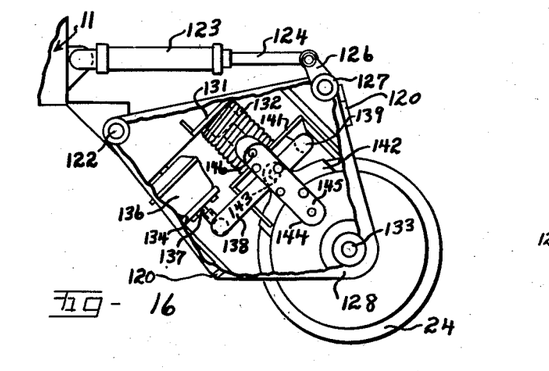
Fig. 16 is a fragmentary, side elevational view, partly broken away, of a rear retractable wheel on the non-working side of the apparatus.
Figure 17:
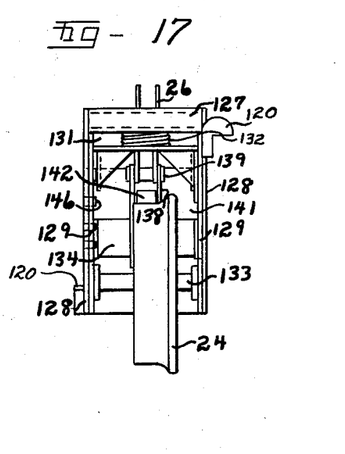
Fig. 17 is a rear elevational view, partly broken away, of the rear retractable wheel shown in Fig. 16.

Referring now to Figs. 16 and 17, the retractable rear wheel 24 is shown pivotally mounted on the non-working side of the adzing apparatus at 122 and actuated by hydraulic cylinder 123 pivotally secured at one end to the vehicle 11. A piston rod 124 at the other end of cylinder 123 is pivotally connected to bracket 126 extending from a sleeve 127 adapted to receive a pin in a manner similar to retractable wheel 26, as explained above. Actuation of cylinder 123 from the position shown in Fig. 16 raises retractable wheel 24. Wheel 24 is secured to a fixed housing (see Fig. 2) on the vehicle 11 by a pin 118.

In order to permit retractable wheel 24 to spring outwardly when running over depressions on the rails, such as a lowered rail at a joint, an inner housing is spring mounted within an outer housing with wheel 24 being secured to the inner housing. The outer housing comprises a pair of parallel side plates 128 and the inner housing comprises a pair of spaced parallel plates 129 arranged in face to face relation with the plates 128 and adapted for sliding relative to and between the plates 128. The outer housing 128 has extending therefrom a spring support 131 on which is mounted a heavy coil spring 132. Axle 133 extends between the plates 129 and wheel 24 is rotatively mounted thereon. A brake cylinder support 134 is mounted between inner plates 129 and has a brake cylinder 136 mounted thereon. A plunger member 137 on brake cylinder 136 extends to brake arm 138 which is pivotally mounted at 139 to a support 141 on the inner housing. A brake shoe 142 is pivotally mounted on arm 138 at 143 and downward movement of brake arm 138 about pivot 139 applies the brake shoe 142 to the rim of wheel 24.

To allow the inner housing 129 to slide relative to the outer housing 128, slots 144 are provided in each of the plates 129 of the inner housing. Block members 145 of a lesser length than slots 144 are secured to plates 129 by inwardly extending pins 146 and are received in slidable relation by slots 144. When the adzing apparatus is in non-working position, the weight of the apparatus pushes the inner housing 129 against the spring 132 and compresses it as shown in Fig. 16. In this position, block member 145 is abutting the lower end of slot 144. Upon the raising of the adzing apparatus or upon the wheel 24 riding over a low spot on the track, the spring 132 will push the inner housing 129 and wheel 24 thereon outwardly until block member 145 abuts the upper end of slot 144. Thus, the adzing apparatus is aided in keeping on the track by this arrangement of the retractable rear wheels.

Figures 18, 19:
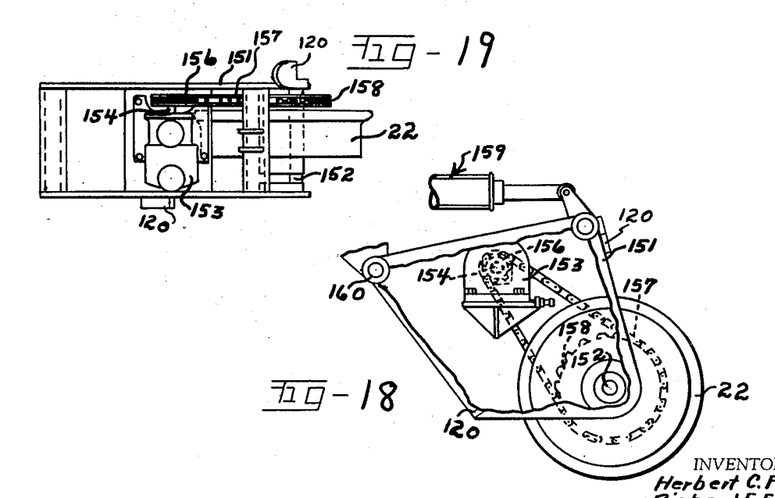
Fig. 18 is a fragmentary, side elevational view, partly broken away, of a front retractable wheel on the non-working side of the adzing apparatus, and showing the drive means for the retractable wheel.
Fig. 19 is a top plan view of the front retractable wheel shown in Fig. 18; and, Fig. 20 is a diagrammatic view of the hydraulic system for the apparatus embodying the present invention.

The retractable front wheels 22 and 23 are driven for propelling vehicle 11 along the railroad track in non-working position, but they do not have brake means as provided for the retractable rear wheels 24 and 26. The front wheels 22 and 23 are similar in construction and function except that front wheel 23 is mounted on a slidable frame while front wheel 22 is mounted directly to the vehicle main frame. Thus, for the purposes of illustration only front wheel 22 is shown in detail. Referring now to Figs. 18 and 19 in which the retractable front wheel 22 on the non-working side of the adzing apparatus is shown, wheel 22 is mounted in housing 151 on axle 152. A fluid motor 153 is secured to the housing 151 for driving wheel 22 and has a drive shaft 154 extending therefrom to a sprocket 156. A sprocket chain 157 connects sprocket 156 to sprocket 158 which is fixed to axle 152 and thereby drives wheel 22. Fluid motor 153 is reversible for driving the wheel 22 in either direction of travel of the vehicle 11 on the rails. Suitable hydraulic fluid means 159 is provided for pivoting wheel 22 to retracted position about the pivot 160. Wheel 22 is secured in retracted and extended positions similarly to rear wheel 24.

Figure 20:
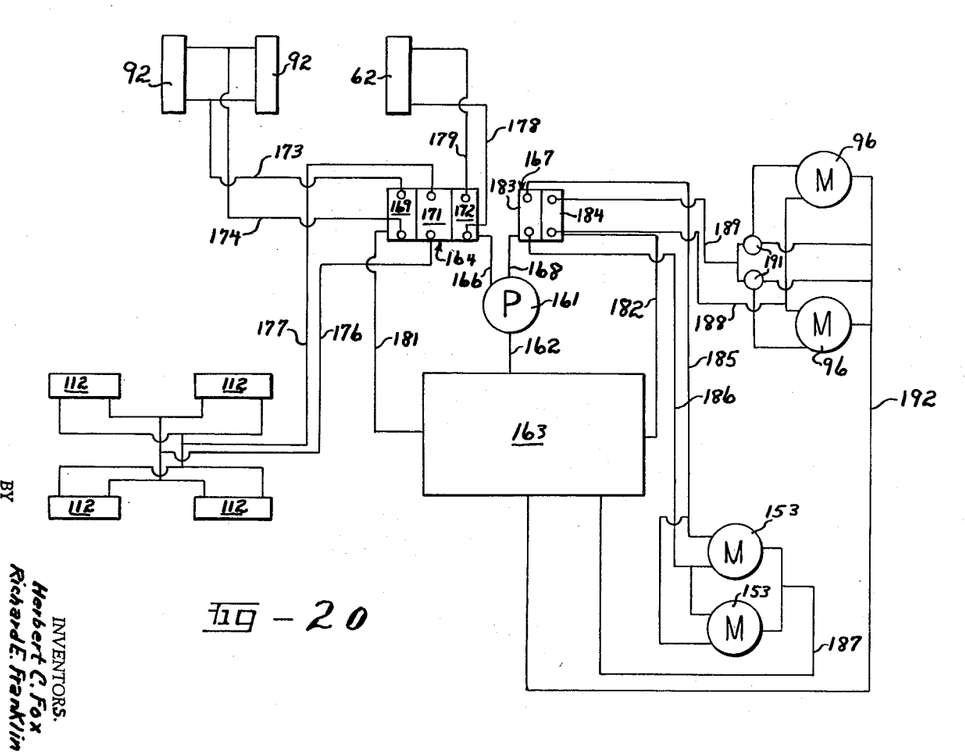

In Fig. 20, a diagrammatic view of the hydraulic system for the adzing apparatus of our invention is shown. A pump 161 is driven by the engine 36 and has a connection 162 to a hydraulic fluid reservoir 163 which supplies fluid for the pump. The pump 161 pumps fluid to the hydraulic control valve 164 through line 166 and to control valve 167 through line 168. The control valve indicated generally by the numeral 164 comprises three sections 169, 171 and 172 respectively, which sections operate different units of the adzing apparatus. Valve section 169 controls the hydraulic cylinders 92 which slide the sliding frames 85 and 86 inwardly and outwardly of the vehicle 11. Lines 173 and 174 establish fluid pressure between valve section 169 and the cylinders 92.

Valve section 171 controls the hydraulic cylinders 112 for the retractable front and rear wheels 22, 23, 24 and 26. Flow lines 176 and 177 connect valve section 171 with the cylinders 112. Valve section 172 controls the hydraulic cylinder 62 for the central support 61. Flow lines 178 and 179 connect the valve section 172 to cylinder 62. A return line 181 from the valve 164 to reservoir 163 is provided in the event no fluid is furnished to the individual units of the adzing apparatus. Likewise, a return line 182 from the valve 167 is provided for a similar purpose. Control valve 167 comprises two sections 183 and 184 for operating different drive units of the adzing apparatus. Valve section 183 controls the fluid motors 153 for the retractable front drive wheels 22 and 23. Fluid lines 185 and 186 govern the flow of fluid through the reversible motors 153 and a return supply line 187 leads back to the supply tank 163.

Valve section 184 controls the reversible motors 96 for the crawlers 14 and 15. Fluid lines 188 and 189 govern the flow of fluid through the motors 96. In order to divide the flow of the hydraulic fluid equally between the motors 96, fluid equalizers 191 are provided in the fluid line 189. Thus, an unusually smooth, uniform drive is obtained by the two crawlers 14 and 15. A return supply line 192 from the fluid equalizers 191 and the motors 96 to the reservoir 163 is provided. Individual control levers 57 control each of the valve sections.

In operation, the adzing apparatus in non-working position is supported on the rails 13 by the retractable front wheels 22 and 23, and the retractable rear wheels 24 and 26. When it is desired to place the adzing apparatus in working position from non-working position, the platform 63 is lowered and the apparatus with the retractable wheels is lifted above the rails and is supported entirely by platform 63. The four retractable wheels 22, 23, 24 and 26 are raised simultaneously by the operator of the vehicle. The rail on the working side of the apparatus is then removed from the crossties along with the tie plates. Next, the sliding frames 85 and 86 are moved outwardly from the working side of the vehicle until the crawlers 14 and 15 are positioned over the crossties at the seats of the removed tie plates. Then the adzing apparatus is lowered on the platform 63 until the crawlers 14 and 15 rest on the crossties at the tie plate seats, and the double flanged wheels 12 rest on the remaining rail. If the adzing apparatus is not level, it may be necessary to adjust the flanged wheels 12 to the proper position. In this position, the adzing apparatus is adapted for working in its working position. Drive shaft 42 drives the brush means 31 and 32 along with the adzing tools 17, 18 and 19. The adzing apparatus is driven in working position by the crawlers 14 and 15.

From the foregoing, it is evident that applicants have provided an adzing apparatus which is adapted for use in forward and reverse directions on a railroad track and may be pivoted on a central support for an adzing operation on the opposite side of the track from which the apparatus was originally working. The central support is located substantially at the center of gravity of the apparatus. Three spaced adzing tools are provided on the apparatus for adzing the crossties and are arranged in alignment with and between the crawlers in the working position of the apparatus. The center adzing tool is preferably, though not necessarily, formed with a wider cutting surface than the other two adzing tools and is employed in both directions of travel of the adzing apparatus. Thus the tie plate seats on the crossties are cut by separate adzing tools which provides a more uniform seat than provided heretofore with a single adzing tool and distributes the cutting load between a plurality of adzing tools. Four retractable wheels are arranged on the vehicle main frame for supporting the entire adzing apparatus in its non-working position thereof on the rails. A pair of sliding frames is mounted on the working side of the apparatus and each of the frames has mounted thereon a crawler and a retractable wheel in side-by-side relation. This arrangement provides ample space between the crawlers for mounting a plurality of adzing tools and allows an unusually compact adzing apparatus.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In apparatus for adzing the crossties of a railroad track after one of the rails has been removed, a vehicle having a frame overlying the remaining rail, supporting wheels on one side of said frame engaging said remaining rail, crawler type supports on the other side of said frame engaging the crossties adjacent the tie plate seats of the removed rail, and at least one rotary cutter head mounted vertically on the frame for rotation in a horizontal plane, said cutter head having a plurality of blades secured on the circumference thereof for adzing the crossties.

2. In apparatus for adzing the crossties of a railroad track after one of the rails has been removed, a vehicle having a frame overlying the remaining rail, supporting wheels on one side of said frame engaging said remaining rail, at least one crawler type support on the other side of said frame engaging the crossties, means for driving the crawler, and a pair of spaced rotary cutter heads mounted on the frame for rotation in a horizontal plane and having a plurality of angularly spaced blades secured thereon for adzing the crossties at the seat of the removed rail, one of said cutter heads being of a larger diameter than the other cutter head thereby taking a wider cut on the crossties.

3. In apparatus for adzing the crossties of a railroad track after one of the rails has been removed, a vehicle having a frame overlying the remaining rail, supporting wheels on one side of said frame arranged to ride along said remaining rail, a pair of crawler type supports mounted on the other side of said frame and engaging at least two crossties simultaneously for adequately supporting said vehicle frame, said crawler supports engaging the crossties at the seats of the removed rail thereby facilitating guiding of the vehicle during the adzing operation, and at least one rotary cutter head mounted on the frame between said crawlers for rotation in a horizontal plane, said cutter head having a plurality of angularly spaced blades secured along the circumference thereof and in perpendicular relation to the surface of the crossties for adzing the crossties at the seats of the removed rail.

4. In apparatus for adzing the crossties on a railroad track with one of the rails removed, a vehicle having a frame overlying the remaining rail, supporting wheels on one side of said frame arranged to ride along said remaining rail, a pair of crawler members supporting the other side of said frame and engaging at least two crossties simultaneously thereby providing a level support for said vehicle, said crawlers being arranged to travel in the tie plate seats of the removed rail thereby aiding in guiding the vehicle, a pair of tandem arranged cutter heads mounted on the vehicle for rotation in a horizontal plane, each of said cutter heads having a plurality of angularly spaced blades secured thereon and generally perpendicular to the top surfaces of the crossties for adzing said tie plate seats, the trailing cutter head being of a larger diameter than the diameter of the leading cutter head thereby taking a wider cut on the crossties.

5. Apparatus as defined in claim 4 and further characterized in that the cutter heads are mounted on the vehicle frame for vertical adjustment relative to the surface of the crossties whereby the depth of cut on the crossties may be predetermined.

6. In apparatus for adzing the crossties of a railroad track in either direction of travel with one of the rails removed, a vehicle having a frame overlying the remaining rail, supporting wheels on one side of said frame arranged to ride along said remaining rail, endless chain-type members engaging at least two crossties simultaneously and supporting the other side of the vehicle, three rotary adzing tools mounted on the frame for rotation in a horizontal plane and aligned in spaced relation longitudinally of the track, means for adjusting said adzing tools vertically relative to the crossties, and each of said adzing tools having a vertically adjustable cutter head with a plurality of radially disposed blades thereon for adzing the crossties at the tie plate seats for the removed rail, said cutter heads being arranged for taking different depths of cut on the crossties with the leading cutter head taking the smallest depth of cut.

7. Apparatus as defined in claim 6 and further characterized in that the plurality of blades for adzing the crossties comprises angularly spaced circular blades extending around the circumference of the cutter heads and arranged in generally perpendicular relation to the upper surface of the crossties.

8. In apparatus for adzing the crossties of a railroad track, the combination of a vehicle having retractable support wheels on both sides thereof for riding along the rails and supporting the adzing apparatus on the track in the non-working position thereof, a pair of double flanged wheels adjustably mounted on one side of the vehicle above the lowered position of the retractable wheels for riding along one rail when adzing the tie seats, the other rail being removed during the adzing operation, a pair of crawler supports mounted on the other side of the vehicle at an elevation above the lowered position of the retractable wheels when in the working position of the apparatus and travelling in the crosstie seats of the removed rail, at least one adzing tool mounted on said vehicle between said crawler supports for adzing the tie seats of the removed rail, means for retracting said retractable wheels, and means for lowering said vehicle from non-working position.

9. In apparatus for adzing the crossties of a railroad track, the combination of a vehicle having retractable support wheels on both sides thereof for riding along the rails and supporting the adzing apparatus in non-working position thereof, a pair of flanged wheels mounted on one side of the vehicle at an elevation above the lowered position of the retractable wheels for riding along one rail in the working position of the adzing apparatus, the other rail being removed in said working position, a pair of crawler supports mounted on the other side of the vehicle at an elevation above the lowered position of the retractable wheels for engaging at least two crossties simultaneously at the tie seats of the removed rail, at least one adzing tool mounted on said vehicle between said crawlers for adzing the crossties at the tie seats of the removed rail, means for lowering and raising said retractable wheels, means for supporting said vehicle when the wheels are retracted and the vehicle is lowered from non-working position to working position, and a pair of slidable frames mounted on said vehicle and movable inwardly and outwardly from the side thereof on which the rail is removed, each of said slidable frames having mounted thereon in side-by-side relation one of said retractable wheels and one of said crawlers.

10. In apparatus for adzing the crossties of a railroad track, the combination of a vehicle having retractable support wheels on both sides thereof for riding along the rails and supporting the adzing apparatus in non-working position thereof, means for lowering and raising said retractable wheels, a pair of endless chain-type crawler supports mounted adjacent one side of the vehicle and engaging at least two crossties simultaneously in the working position of the adzing apparatus, one of said rails being removed in said working position, at least one adzing tool mounted between said crawlers for adzing the crossties at the tie seats for the removed rail, and a pair of slidable frames mounted on the underside of said vehicle and movable inwardly and outwardly from the side thereof on which the rail is removed, each of said slidable frames having mounted thereon in side-by-side relation one of said support wheels and one of said crawlers.

11. In apparatus for adzing the crossties of a railroad track, the combination of a vehicle having retractable support wheels on both sides thereof for riding along the rails and supporting the adzing apparatus in non-working position thereof, means for lowering and raising said retractable wheels, a pair of crawler supports mounted adjacent one side of the vehicle and adapted for engaging at least two crossties simultaneously in the working position of the adzing apparatus in which the retractable wheels are retracted and one of the rails is removed, at least one adzing tool mounted between the crawlers for adzing the crossties at the tie seats for the removed rail, means for lowering said vehicle from non-working position to working position, a pair of slidable frames mounted on the side of said vehicle on which the rail is removed, each of said slidable frames having mounted thereon in side-by-side relation one of said retractable wheels and one of said crawlers, the retractable wheel being mounted on said slidable frame outwardly of the crawler, and said slidable frames being movable inwardly and outwardly from the vehicle a distance at least equal to the distance between the crawler and the retractable wheel thereon.

12. Apparatus as defined in claim 11 and further characterized in that means are mounted on the slidable frames for driving said crawlers, and additional means are mounted on said slidable frames for raising and lowering the support wheels thereon.

13. Apparatus as defined in claim 11 and further characterized in that the means for lowering the vehicle from non-working position to working position comprises fluid pressure means having relatively movable parts, one of said parts having a platform on the lower end thereof adapted for resting on the crossties at substantially the center of gravity of the adzing apparatus whereby the adzing apparatus may be pivoted about said platform for an adzing operation on the opposite side of the railroad track.

14. Apparatus as defined in claim 11 and further characterized in that the retractable support wheels on one end of the vehicle are mounted on inner housings slidably arranged within outer housings, and resilient means mounted on said outer housings urge said inner housings and wheels thereon downwardly toward the rails.

15. In apparatus for adzing the crossties of a railway track, the combination of a vehicle having retractable support wheels on both sides thereof for riding along the rails in non-working position of the adzing apparatus, a pair of endless chain-type crawlers mounted on one side of the vehicle at an elevation above the lowered position of the retractable wheels and engaging at least two crossties simultaneously in the working position of the adzing apparatus with one rail removed, at least one adzing tool mounted on said vehicle between said crawlers for adzing the crossties at the tie seats for the removed rail, means for lowering and raising said support wheels, and fluid pressure means for supporting said vehicle when the support wheels are raised and the vehicle is lowered from non-working position to working position, said fluid pressure means comprising relatively movable parts, one of said parts having a platform on the lower end thereof adapted for resting on the crossties at substantially the center of gravity of the adzing apparatus whereby the adzing apparatus may be pivoted about said platform for an adzing operation on the side of the railroad track opposite the removed rail.

16. In apparatus for adzing the crossties of a railroad track, the combination of a vehicle having retractable support wheels on both sides thereof for riding along the rails in non-working position of the adzing apparatus, a pair of crawler supports mounted on one side of the vehicle and adapted for engaging at least two crossties simultaneously in the working position of the adzing apparatus with one rail removed, at least one rotary cutter head mounted on the vehicle between the crawler wheels for rotation in a horizontal plane, said cutter head having a plurality of angularly spaced blades secured thereon for adzing the crossties at the tie seats for the removed rail, power means for raising and lowering said support wheels, and means for supporting said vehicle when the support wheels are raised and lowered, said vehicle support means also lowering and raising said vehicle relative to the track.

17. In apparatus for adzing the crossties of a railroad track, the combination of a vehicle having retractable support wheels on both sides thereof for riding along the rails and supporting the adzing apparatus in non-working position thereof, a pair of crawler supports mounted on one side of the vehicle and adapted for engaging at least two crossties simultaneously in the working position of the adzing apparatus with one rail removed, at least one rotary cutter head mounted between the crawler supports for rotation in a horizontal plane, said cutter head having a plurality of angularly spaced blades secured thereon for adzing the crossties at the tie seats for the removed rail, a pair of slidable frames mounted on one side of said vehicle and movable inwardly and outwardly from the side thereof on which the rail is removed, each of said slidable frames having mounted thereon one of said crawler supports, means for sliding said frames inwardly and outwardly of the vehicle, means for raising and lowering said support wheels, and means for lowering and raising said vehicle between non-working position and working position of the adzing apparatus.

18. In apparatus for adzing the crossties of a railroad track, the combination of a vehicle having support wheels on both sides thereof for riding along the rails in non-working position of the adzing apparatus, a pair of endless crawler supports mounted on one side of the vehicle for engaging at least two crossties simultaneously in working position of the adzing apparatus with one rail removed, at least one adzing tool mounted on said vehicle between said crawler supports for adzing the crossties at the seats for the removed rail, and fluid pressure means mounted substantially at the center of gravity of the adzing apparatus and having a platform on the lower end thereof adapted for resting on the crossties and supporting solely the entire adzing apparatus, whereby actuation of said fluid pressure means lowers said platform and raises said adzing apparatus above the rails so that said apparatus may be pivoted about said platform for an adzing operation on the side of the railroad track opposite the removed rail.

19. In a railroad maintenance vehicle having working tools thereon for working along a side of a railroad track, retractable support wheels on both sides of the vehicle for riding along the rails in the travelling position thereof, a pair of slidable frames mounted on the vehicle and movable inwardly and outwardly from one side thereof, a crawler support mounted on each of the slidable frames and engaging at least two crossties simultaneously in the working position of the vehicle with one rail removed, one of said support wheels being mounted on each of said frames outwardly of said crawler support and in side-by-side relation thereto, the crawlers engaging the crossties at the seats for the removed rail, and said slidable frames being movable inwardly and outwardly from the vehicle a distance substantially equal to the distance between the crawler and the support wheel thereon.

References Cited in the file of this patent

UNITED STATES PATENTS

| | | |
|---|---|---|
| 1,088,209 | Collet | Feb. 24, 1914 |
| 1,427,516 | Carman | Aug. 29, 1922 |
| 1,537,905 | Warren | May 12, 1925 |
| 1,727,557 | Pierce | Sept. 10, 1929 |
| 1,798,783 | Buettner et al. | Mar. 31, 1931 |
| 1,820,636 | Talboys | Aug. 25, 1931 |
| 1,830,977 | Banfer | Nov. 10, 1931 |
| 2,336,652 | Talboys | Dec. 14, 1943 |